United States Patent [19]

Lang-Ree et al.

[11] 3,987,718
[45] Oct. 26, 1976

[54] HAMBURGER PATTY AND BUN COOKER

[75] Inventors: Nils Lang-Ree, Los Altos; Edward D. Baker, San Francisco, both of Calif.

[73] Assignee: NPI Corporation, Burlingame, Calif.

[22] Filed: July 23, 1975

[21] Appl. No.: 598,339

[52] U.S. Cl. .................................. 99/386; 99/423; 99/443 C
[51] Int. Cl.² ........................................ A47J 37/04
[58] Field of Search .................... 99/386, 339–340, 99/349, 352, 375, 423, 443; 198/30, 162, 164; 156/240, 289, 583

[56] References Cited
UNITED STATES PATENTS

| | | | |
|---|---|---|---|
| 1,340,796 | 5/1920 | Schmidt | 198/164 X |
| 3,450,027 | 6/1969 | Lohr et al. | 99/423 |
| 3,610,134 | 10/1971 | Morley | 99/423 UX |
| 3,646,880 | 3/1972 | Norris | 99/443 C X |
| 3,693,452 | 9/1972 | McGinley et al. | 99/443 C X |
| 3,693,533 | 9/1972 | Liepa | 99/443 C X |
| 3,770,536 | 11/1973 | Haigh | 156/289 X |
| 3,788,941 | 1/1974 | Kupits | 156/289 X |
| 3,841,937 | 10/1974 | Erwin | 156/289 X |

Primary Examiner—Peter Feldman
Assistant Examiner—Arthur O. Henderson
Attorney, Agent, or Firm—Lothrop & West

[57] ABSTRACT

A hamburger patty and bun cooker has a frame supporting a pair of vertically spaced, relatively flat, horizontal heated platens. One run of an endless conveyor on said frame travels through the space between the platens to advance hamburger patties through such space. At least one of the platens is provided with a low-friction layer between it and an advancing patty. The layer is constituted by jets of hot air discharged over the platen surface or by a Teflon-coated thin, metal foil sheet or by a Teflon-carrying thin, fiber glass sheet, the sheets being readily changeable. Bun portions for the individual patties are advanced on the same frame in paths parallel to the hamburger patties by comparable endless conveyors and are heated by individual platens on the frame as the bun portions advance.

2 Claims, 9 Drawing Figures

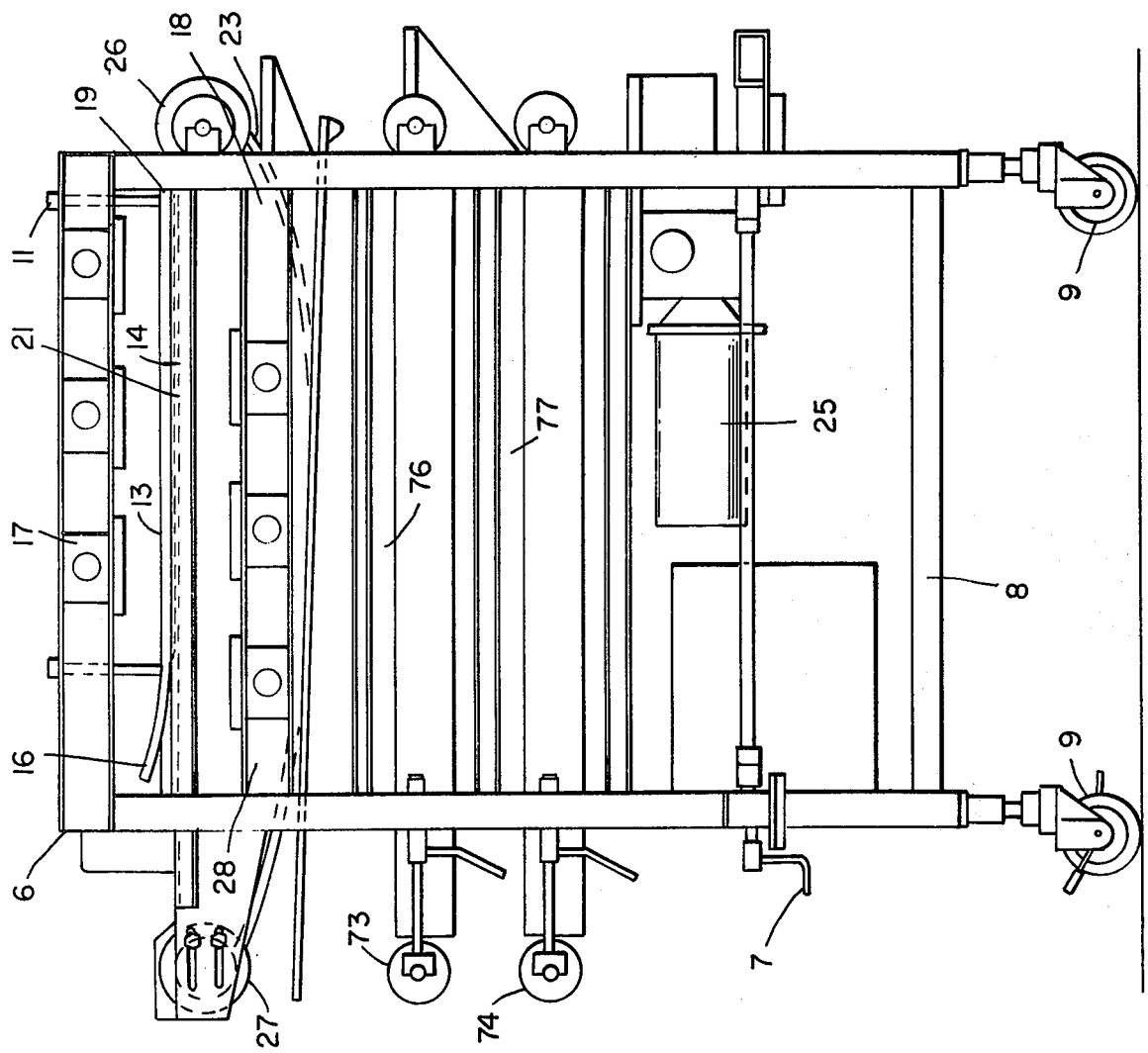
FIG_1
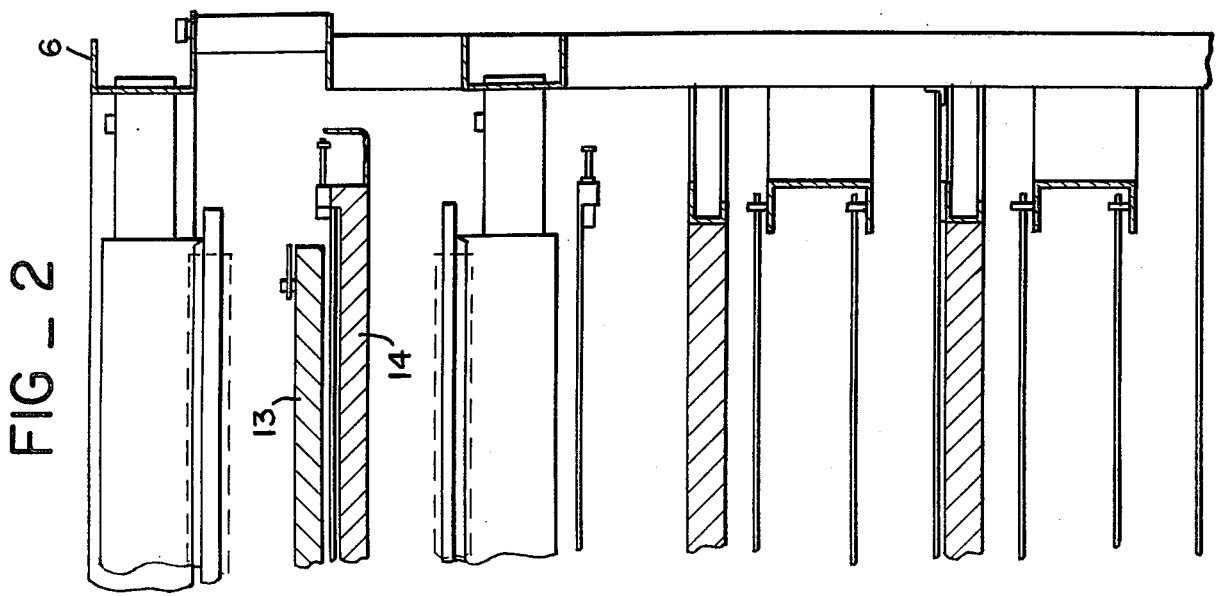
FIG_2

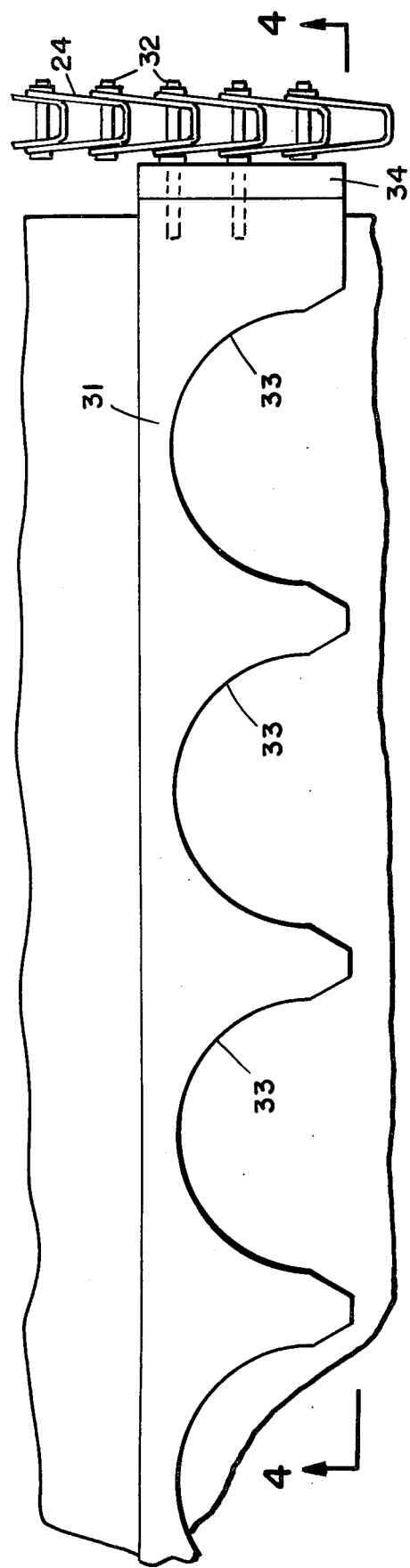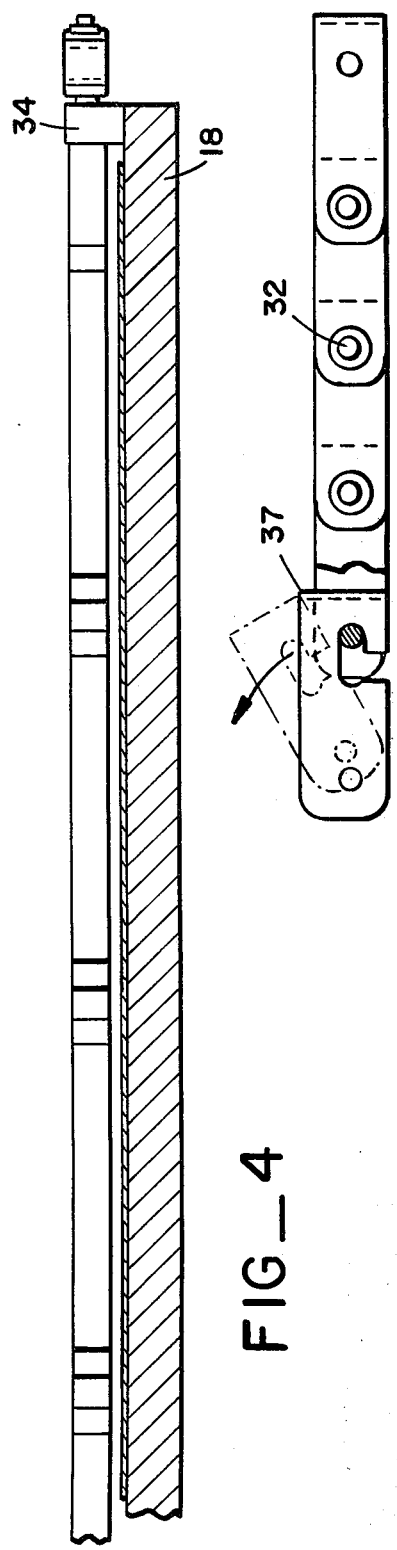

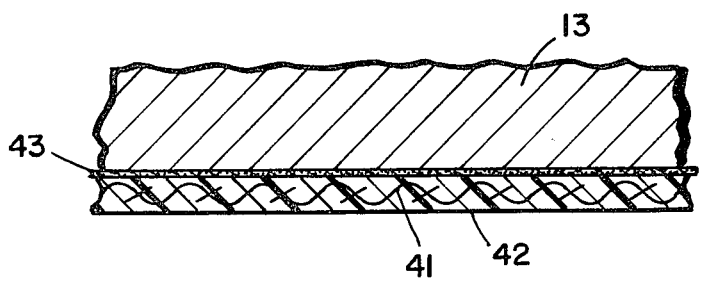
FIG_6
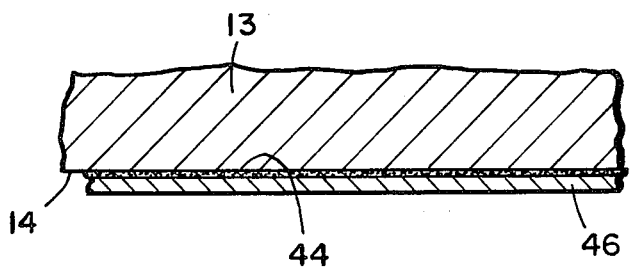
FIG_7
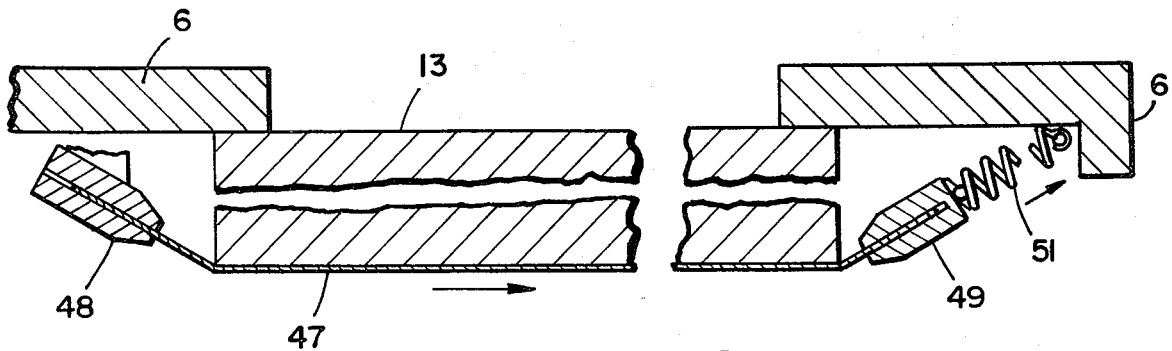
FIG_8
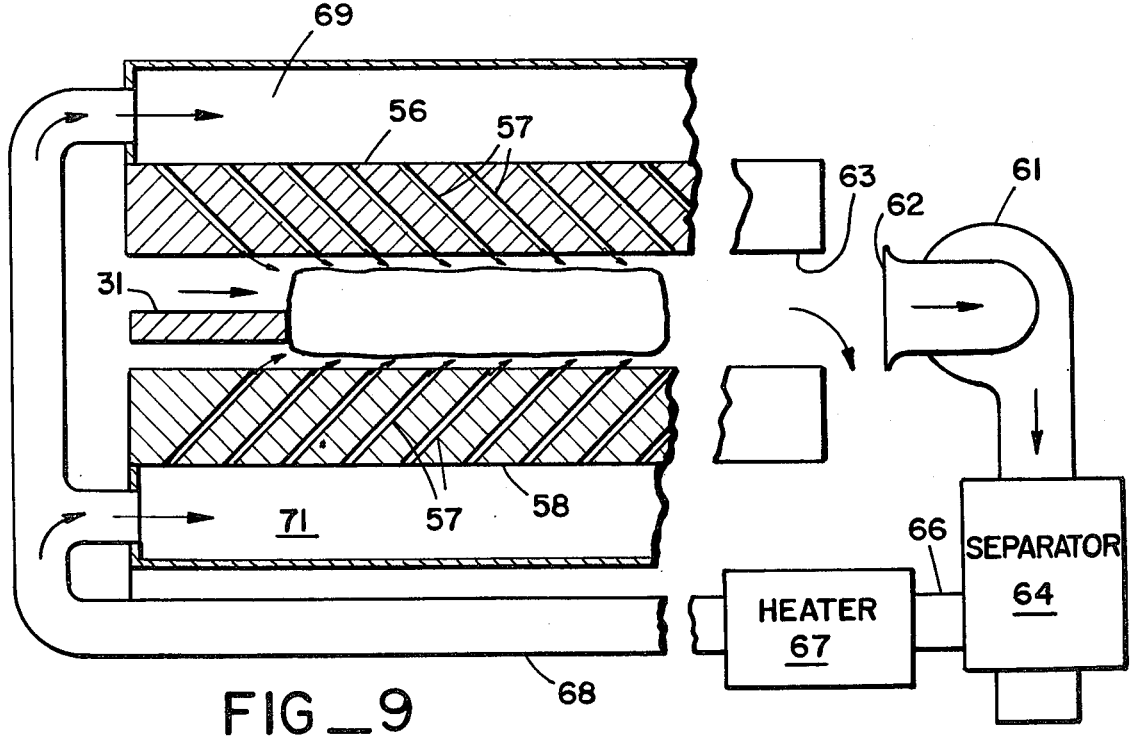
FIG_9

HAMBURGER PATTY AND BUN COOKER

In the preparation of hamburger patties, as well as the usually accompanying bun portions, in relatively large quantities and in a generally continuous fashion, it is highly desirable to maintain a good heat transfer relationship between the heating means and the patties and the buns. At the same time it is desired to advance the patties, as well as the buns, in a manner involving very low friction between the advancing components and the surrounding mechanism.

It is also desirable to provide a cooking arrangement of the sort described in which liquids and gases developed during the cooking operation do not quickly foul the mechanism, so that a high standard of cooking may be maintained.

It is therefore an object of the invention to provide for the foregoing desirable factors.

Another object of the invention is to provide a very low-friction interrelationship between advancing patties and buns in a mechanism for cooking them.

Another object of the invention is to provide a highly sanitary, easily maintained and serviced and consistently operating machine.

A further object of the invention is in general to provide an improved hamburger patty and bun cooker.

Other objects, together with the foregoing, are attained in the embodiments of the invention described in the accompanying description and illustrated in the accompanying drawings, in which:

FIG. 1 is a side elevation, partly diagrammatic, of a hamburger patty and bun cooker pursuant to the invention;

FIG. 2 is a partial cross-section, the plane of which is indicated by the line 2—2 of FIG. 1, symmetrical portions of the machine being broken away to reduce the size of the figure;

FIG. 3 is a plan of a portion of one run of an endless conveyor utilized in the device, portions being broken away;

FIG. 4 is a cross-section, the plane of which is indicated by the line 4—4 of FIG. 3;

FIG. 5 is a side elevation of a fragment of a conveyor chain showing a disconnecting link therein;

FIG. 6 is a diagrammatic cross-section through one form of platen and layer thereon;

FIG. 7 is a view similar to FIG. 6 but with a different form of platen and layer thereon;

FIG. 8 is a cross-section comparable to the preceding figures but showing diagrammatically a removable foil tensioning structure with the associated platen; and FIG. 9 is a diagram comparable to FIG. 6 but showing additional structure in cross-section in a modified device utilizing a hot air low-friction layer.

In this description the word "cooker" means generally a device effective to heat a raw or partially cooked or previously frozen hamburger patty or the like in a fashion to produce an attractive appearing, palatably cooked hamburger patty with quickly attained, relatively uniform results. As to the buns, the reference is to heating bun portions in such a fashion as to provide suitable surfaces to receive the cooked patty and to present an attractive and acceptable appearance to the ultimate consumer.

In the customary embodiment the device includes a main frame 6 comprised of suitable channels and shapes to afford a proper support for the associated components. The frame is preferably vertically extensible by use of a hand crank mechanism 7. This is not disclosed in detail as it is a standard construction, effective to move the upper portions of the frame up and down in the same or different amounts with respect to the lower portion 8 of the frame, which is supported for transport on floor-engaging wheels 9 in the customary way.

The upper portion of the frame, through adjusting screws 11, carries an upper platen 13. The platen is a plate of aluminum or similar good heat transfer material arranged horizontally. The platen has a flat or planar lower surface 14 extending over most of the plate, but at one end, the loading end, there is an inclined or upturned converging portion 16 extending across the width of the platen. Above the platen 13 in a position to impart heat thereto for ready heat transfer is a suitable heat source 17. In this instance the source is a plurality of radiant gas burners. Heat from the burners is transmitted to and through the conducting platen 13.

Also on the frame is a lower cooking platen 18. This, also, is preferably fabricated of an aluminum plate or comparable material for good heat transfer and is arranged on the frame so that its upper, flat surface 19 is substantially parallel to the major portion of the upper cooking platen. The lower platen 18 is disposed with respect to the upper platen so as to provide a substantial space 21 therebetween extending horizontally for about the width of the frame and for the length of the frame to define an intermediate cooking space or volume for one, or preferably several, rows of patties and buns. The lower platen likewise has a source of heat 22 such as another plurality of radiant gas burners effective to transfer heat to and through the lower platen.

Disposed on the frame is a first endless conveyor 23. This preferably takes the form of a pair of parallel side chains 24 respectively arranged around pairs of sprockets 26 and 27, at least one pair of which is appropriately driven by a motor 25. The sprockets are arranged on the frame 6 so that at least one pair of them is adjustable in a horizontal direction and so that the upper run 28 of the conveyor extends through the space 21 and advances in a direction to move a patty from the relatively large entrance or loading space below the upturned end 16 of the upper platen toward the other end thereof for patty discharge.

The conveyor advances with its upper run 28 going from left to right in FIG. 1. Patties manually or automatically deposited on the lower platen are advanced through the space 21 by one of a number of cross members 31 (see especially FIGS. 3 and 4). Each cross member 31 or pusher is a relatively thin plate having adequate clearance with respect to the adjacent platens and is connected by special pins 32 to the respective side chains. Each member 31 has a number of scallops 33 or indentations along its leading edge so as to encounter and substantially surround the trailing halves of patties deposited side by side on the lower platen.

It is considered important that the cross member 31 not physically encounter either of the adjacent platens. For that reason, the cross member 31 is at each side provided with support blocks 34 of a low-friction material such as Teflon. This can withstand the cooking heat and operates easily, being slidably supported on the subjacent lower platen 18. In this way, clearance is maintained between the lower portion of the cross member and the lower platen and between the upper portion of the cross member and the upper platen.

Since sanitation is of great consequence in a device of this sort, each of the side chains 24 is particularly provided with at least one detachable link 37 therein, as shown in FIG. 5, so that from time to time, by bunching the slack in the side chains and unhooking the links 37, the conveyor, including its cross members, can readily be stripped from the support sprockets and removed from the machine to be cleaned and replaced. The removal of the conveyor also affords ready access to the adjacent platens for similar service.

Particularly pursuant to the invention, it is desired to advance the patties with very slight friction throughout most or all of their travel. In the entrance portion of the space 21 near the upturned platen end 16, the patties may have substantial physical contact with the platens, both above and below, since sometimes some of the patties are initially of relatively thick dimension and are squeezed slightly and are in close heat transfer relationship with the platens as they enter the machine. That is, they are reduced to a substantially uniform thickness by being slightly compressed as they travel through the converging entrance and then into the uniform space 21. As the patties warm and cook, they shrink and become thinner than the space 21.

There is especially provided at least one low-friction layer in the space 21, preferably between the lower platen and the patty. Two such layers can be provided between both of the platens and the advancing patty. There are several ways of establishing a low-friction layer. Particularly as shown in connection with the upper platen 13 in FIG. 6, there is provided a sheet 41 comprised of a Teflon body reinforced with fiber glass to provide a low-friction, largely Teflon, exposed lower surface 42 for loose or tight contact with the patty, depending somewhat on the adjustment of screws 11 and the operator's preference. The fiber glass and Teflon sheet 41 is conveniently positioned on the platen 13 by an intervening layer 43 of a suitable adhesive not subject to deterioration by heat. This affords a low-friction layer.

Since the Teflon is somewhat porous, its life is relatively short in this service. That is, gases or vapors evolved during cooking and that condense, as well as fat, and other products, eventually lodge in and tend to clog the porous Teflon. When that occurs, the low-friction character of the Teflon surface is reduced. It is then necessary for the operator to strip the fiber glass and Teflon layer 41 from the platen, preferably by causing a parting in the adhesive layer 43. A new, fresh, porous fiber glass and Teflon layer is substituted and held with new adhesive. In this way successive relatively low-friction layers are provided in the space 21. Similarly, a low-friction layer can be provided on the lower platen.

As an alternate, as shown in FIG. 7, and for somewhat better heat transfer, a platen, such as the upper platen 13, is provided with an adhesive layer 44 effective to secure in position a relatively thin sheet 46 of stainless steel or comparable metallic foil practically having a thickness of about one or two-thousandths of an inch. The stainless steel foil has a relatively low coefficient of friction and is less porous than the fiber glass and Teflon combination and has a better heat transfer capability, but is subject somewhat to wrinkling and displacement out of a plane. Foil can be applied to both platens to provide two low-friction layers within the space 21. The foil can be removed and replaced when desirable.

As a further alternative, the arrangement in FIG. 8 may be employed. In this instance, the platen 13 (or 18) is not provided with any adhesive layer. Rather, a thin sheet 47 of stainless steel foil is at one end gripped by a holder 48 extending across the entrance end of the platen and secured to the frame 6. At the other end of the platen, the foil sheet 47 is also gripped in an appropriate holder 49 connected through tension springs 51 to another portion of the frame 6. In this instance the foil is stretched tightly over the exposed face of the platen. Not being adhesively secured, the foil sheet can easily be released from the holders 48 and 49 and can as readily be replaced. By employing sufficient tension in the springs 51, the tendency to wrinkle is reduced and the ability to remove wrinkles that form is increased.

As a still different alternative, the low-friction layer can be provided, as shown in FIG. 9, by omitting precise contact between the patty and one or both of the adjacent platen structures. As shown in FIG. 9, the upper platen 56 is of aluminum plate as before and is comparably mounted, but in this instance the platen is provided with a number of small through passages 57. These can be arranged perpendicular to the surface of the platen, but it is preferred to incline them so that they have a component toward the outlet or discharge end of the machine. Similarly, the lower platen 58 is provided with some of the passages 57.

Means are provided for supplying the openings 57 with streams of hot air. A blower 61 on the frame has an air entrance 62 adjacent the outlet 63 or discharge of the conveyor 23. There is enough space between the outlet 63 and the inlet 62 so that a patty can readily be discharged between them. Air taken in through the inlet, largely from the space 21, at a relatively low pressure is given increased impetus in the blower and travels into a separator 64, usually of a centrifugal type, in which debris and solid material in the stream are separated from the flowing air. The cleaned air from the separator travels through a duct 66 into an appropriate heater 67.

The air taken in through the inlet 62 is partly ambient atmospheric air and is partly air received from the outlet 63. The air in the duct 66 has considerably more than atmospheric temperature. The heater 67 is effective further to increase the temperature of the air to an appropriate value; for example, 900° F. The heated air flows from the heater through a duct 68 branched to open into a pair of chambers 69 and 71, one in association with the upper platen and one in association with the lower platen.

Cleaned and heated air in the chambers 69 and 71 discharges with considerable force through the openings 57. The force is preferably sufficient to keep the patty within the space 21 in very light frictional contact, if any, with the lower platen and substantially out of frictional contact with the upper platen. The cross member 31 or pusher is therefore effective to move the patty forwardly for cooking with very little resistance and the consumption of only a small amount of power. The discharging air from the openings 57 has a component tending to advance the patties, but is not usually counted on for such purpose. The issuing air from the various openings is sufficient to keep them from becoming readily clogged and tends to blow debris and vapors toward the discharge end of the space 21. Being heated, the air is effective to assist in maintaining a high temperature of the patties. Usually the same burners, such as 17 and 22, are relied upon as the principal supply or input of heat.

In all of the instances described, there is provided a low-friction layer, or two of them, either by fiber glass and Teflon or by metal foil or by air, for assisting in advancing the patties through the machine.

Since it is advantageous to do so, the same frame 6, as particularly shown in FIGS. 1 and 2, carries additional endless conveyors 73 and 74 operating between electrically heated platens 76 and 77 for separately warming or a the lower surface of the separate top portions of the number of buns and also cooking or warming the top surface of the separate lower portions of the buns. The arrangement is such that preferably the upper and lower bun portions and the hamburger patties discharge simultaneously for assembly.

What is claimed is:

1. A hamburger patty and bun cooker comprising a frame, a horizontally extending upper patty broiler platen mounted on said frame, a horizontally extending lower patty broiler platen having side portions, means for mounting said lower platen on said frame below said upper patty broiler platen and defining a space therebetween, means on said frame for heating said platens, an endless conveyor mounted on said frame with one run of said endless conveyor disposed to advance through said space, said endless conveyor including at least one cross member, means providing a low-friction layer in said space between said side portions of said lower platen, and means for supporting said cross member on said side portions of said lower platen and out of contact with said low-friction layer.

2. A device as in claim 1 in which said supporting means includes a block secured to said endless conveyor and slidable on said lower platen.

* * * * *